United States Patent
Ibaraki et al.

(10) Patent No.: US 6,755,888 B2
(45) Date of Patent: Jun. 29, 2004

(54) FACILITY FOR REDUCING METAL OXIDE, METHOD FOR OPERATING THE FACILITIES AND MOLDINGS AS RAW MATERIAL TO BE CHARGED TO REDUCTION FURNACE

(75) Inventors: Tetsuharu Ibaraki, Chiba (JP); Takashi Hiromatsu, Chiba (JP); Satoshi Kondo, Chiba (JP); Shoji Imura, Chiba (JP); Yoichi Abe, Chiba (JP)

(73) Assignee: Nippon Steel Corporation, Tokyo (JP)

( * ) Notice: Subject to any disclaimer, the term of this patent is extended or adjusted under 35 U.S.C. 154(b) by 81 days.

(21) Appl. No.: 09/913,287

(22) PCT Filed: Dec. 12, 2000

(86) PCT No.: PCT/JP00/08771
§ 371 (c)(1),
(2), (4) Date: Nov. 2, 2001

(87) PCT Pub. No.: WO01/42516
PCT Pub. Date: Jun. 14, 2001

(65) Prior Publication Data
US 2002/0174745 A1 Nov. 28, 2002

(30) Foreign Application Priority Data

| Dec. 13, 1999 | (JP) | 11-353434 |
| Dec. 16, 1999 | (JP) | 11-357012 |
| Dec. 6, 2000 | (JP) | 2000-372016 |
| Dec. 6, 2000 | (JP) | 2000-372019 |

(51) Int. Cl.⁷ .............................................. C21B 13/08
(52) U.S. Cl. ............................ 75/414; 75/313; 75/484; 75/770
(58) Field of Search ................... 75/414, 313, 484, 75/770

(56) References Cited

U.S. PATENT DOCUMENTS

4,133,756 A * 1/1979 Arai et al. ................... 210/742
6,120,577 A * 9/2000 Koros et al. .................. 75/483

FOREIGN PATENT DOCUMENTS

| JP | 43-12496 | 10/1968 |
| JP | 52-45518 | 4/1975 |
| JP | 59-39095 | 3/1984 |
| JP | 6-206097 | 7/1994 |
| JP | 9-19607 | 1/1997 |
| JP | 11-12619 | 1/1999 |

* cited by examiner

Primary Examiner—Melvyn Andrews
(74) Attorney, Agent, or Firm—Wenderoth, Lind & Ponack, L.L.P.

(57) ABSTRACT

The present invention provides a reducing furnace of the rotary hearth-type and a method for reducing a metal oxide simplified in the process from dehydration to molding, according to which a moisture-rich powdery raw material is reduced at low cost. The present invention also provides an operation method whereby dusts or sludge generated in the refining or processing of metal are economically recycled.

A powdery mixture having a moisture content of 100% or higher relative to the total mass of a metal oxide-containing powder and a carbon-containing powder is made into a slurry and mixed by stirring. Thereafter, the slurry is dehydrated to a moisture content of 16 to 26% and compression-molded into articles. The cylindrical or granular shaped articles having a thickness or diameter of 30 mm or less thus obtained are fed to a zone the atmospheric temperature of which is 1170° C. or lower in the furnace and reduced through calcination by a rotary hearth reducing furnace thereby to provide a metal.

11 Claims, 5 Drawing Sheets

FACILITY FOR REDUCING METAL OXIDE, METHOD FOR OPERATING THE FACILITIES AND MOLDINGS AS RAW MATERIAL TO BE CHARGED TO REDUCTION FURNACE

This application is a 371 application of PCT/JP00/08771 filed Dec. 12, 2000.

TECHNICAL FIELD

The present invention relates to a facility for reducing metal oxides, a rotary hearth reducing furnace which is the facility mentioned above, a method for reducing a metal oxide using the same, and to a method for reducing metal oxide-containing dusts and sludge generated by the metal refining or processing industry.

BACKGROUND TECHNOLOGY

There have been proposed a variety of processes for producing reduced iron or an iron alloy. Of these, there is one known as a process of high productivity that that includes the use of a rotary hearth reducing furnace, with which the reduction of a metal is effected. The essential part of this process is the use of a rotary hearth reducing furnace for reducing a metal oxide, the furnace being a firing furnace of the type in which, under a fixed fire resistant ceiling and side walls, a center-lacking-disk-shaped fire resistant hearth rotates along a rail at a constant speed (hereafter, referred to as a rotary furnace). Generally, the diameter of the disk-shaped hearth is from 10 meters to 50 meters, and its width is 2 meters to 6 meters.

After having been mixed with a carbon-based reducing agent, a metal oxide-containing powder as a raw material is pelletized to make raw material pellets and fed to the rotary hearth. The raw material pellets are spread all over the hearth. Since the raw material pellets are held stationary in relation to the hearth, this process has the advantage that the raw material pellets are hardly broken up in the furnace and therefore it is free from the problem of the raw material breaking up to form a powder which sticks to the fire resistant hearth. Moreover, this process has the advantage of high agglomerate production yield. Furthermore, since its productivity is high and a less expensive coal-based reducing agent and powdered raw materials can be employed, in recent years, the number of cases employing this method are increasing.

The rotary hearth method is also effective in reducing dusts generated through the process of steel manufacture in blast furnaces, basic oxygen furnaces, and electric arc furnaces, and in reducing thickener sludge generated in a rolling step, and in removing impurities therefrom. This method has been adopted for treating dusts and is effective in recycling materials.

How the rotary hearth method is carried out is described below in outline. Firstly, after metal oxides such as ores, dusts, or sludge as a raw material are mixed with a certain amount of a carbon-based reducing agent required for the reduction of the oxides, the resulting mixture is granulated into pellets of from several millimeters to several tens of millimeters by a granulator such as a pan pelletizer while supplied with water so as to have an average moisture content of approximately 10%. In the case where the particle size of an ore as the raw material or that of the reducing agent is large, after having been crushed by a pulverizer such as a ball mill, the materials are kneaded and granulated.

The pellets thus obtained are fed onto the hearth of a rotary furnace in layers. The pellets spread all over the hearth are quickly heated and calcined at temperatures as high as 1100 to 1300° C. for 5 to 20 minutes, whereby metal oxide is reduced by the reducing agent mixed in with the pellets to provide a metal. Depending on what kind of metal is to be reduced, the degree of metallization varies. In the case of iron, nickel, or manganese, the degree of metallization reaches 95% or higher. Even if the metal to be reduced is chromium, the reduction of which is difficult, the degree of metallization reaches or exceeds 50%. Moreover, in the case of treating dusts generated by the steel manufacturing industry, their recirculation back to a blast or electric arc furnace is easy, because such impurities as zinc, lead, alkaline metals, and chlorine are volatilized as the reduction reaction proceeds.

As described above, in the method for reducing metal or dusts generated in the process of steel manufacture through the use of a rotary hearth, it is necessary to pelletize the raw material and the reducing agent. It is also essential that, as a pretreatment of the raw materials, the mixture of a powdered metal oxide and a reducing agent as the raw material be brought into a condition suitable for granulation. As the pretreatment, milling of the raw materials, kneading with a ball mill, or any of a variety of techniques are carried out.

DISCLOSURE OF THE INVENTION

As described above, the reduction of a metal oxide with the use of a rotary hearth method using a conventional method is excellent with respect to productivity or production cost, so that a metal is produced economically. However, in the prior art, it was important to mix a raw material and a reducing agent and then pelletize the resulting mixture. Therefore, it was necessary to employ a material of high granularity or to install an expensive pulverizer in the production line for crushing the raw material to improve its granularity. This resulted in a rise in the production cost.

In other words, when an ore such as iron ore was employed as the raw material, due to its large particle size, it was in many cases granulated to form pellets after having been milled so as to have an average particle size of about several tens to a hundred microns. This involved the use of a costly device for crushing, electricity to drive the pulverizer, and the maintenance costs due to the wear of the pulverizer.

In some cases, a microfine powder raw material was employed for saving the cost of milling. However, due to the strict limitations on, e.g., particle size in the selection of the raw material, such a method was not in wide use. For solving such problem, the use of a wet-beneficiated powdery ore or thickener dusts generated in a blast furnace or basic oxygen furnace, scale pit sludge produced in the rolling step, or sedimentary sludge generated in the acid cleaning step is effective. However, even in this case, there was a problem that the moisture content of such raw materials was so high that it was hard to granulate them. In other words, since these raw materials are finely divided powders each having a particle size of from about 1 micron or less up to a hundred microns and thus liable to be sludgy when moisturized, even if dehydrated by a vacuum dehydrator or filter presser, their moisture content cannot be lower than 20 to 50%. The moisture content of the raw material upon pelletization is suitably about 8 to 13% by mass and therefore these raw materials collected according to the wet process were too moist to be granulated as they were.

One way to solve such problems as described above is to completely dry these raw materials using a heat source such as hot air. However, since these powdery raw materials are quasi-coagulated in the drying step and thus unable to be granulated as they are, after having been brought back into a micro-powdery condition again through milling, they were hydrated together with, for example, coke breeze, granulated, and reduced on the rotary hearth.

Accordingly, in the case of utilizing any of these raw materials collected by the wet process in such manner as described above, after drying with a large amount of heating energy, the material is moistened again and evaporation of moisture upon granulation entails the use of a heat source again. This is not at all economical as a method for reducing metal.

Especially, dusts or sludge generated by the metal refining or processing industry exemplified by the steel industry and collected from wet dust collectors or sedimentation tanks have, at a maximum, a moisture content of 80%. Attempts at reducing them in accordance with the rotary hearth method were faced with problems related to the treatment in the drying step and the milling or crushing step after drying.

For solving these problems, for example, as recited in Japanese Patent Laid-Open Publication No. Hei. 11-12619, there has been proposed a method including using a raw material in a rotary hearth-type reducing furnace without granulation, in which the raw material is shaped in the form of tiles by a compression molding machine and the resulting tiles are used in the rotary hearth reducing furnace. However, even in this method, the use of a raw material containing a large amount of moisture had problems. That is, the method disclosed by Japanese Patent Laid-Open Publication No. Hei. 11-12624 also required the moisture content of a raw material in the form of tiles to be adjusted to 6 to 18%. When a microfine powder of about hundred microns was in a wet condition, dehydration by an ordinary dehydrator enabled the moisture content to be reduced to no lower than 15 to 30% by mass. In other words, this method also requires the raw material to be dried in addition to dehydration prior to the reduction, resulting in the necessity for complicated moisture control to which an increase in the cost of equipment therefore is a contingency.

Furthermore, as raw materials in the form of tiles are difficult to handle, when transported by an ordinary belt conveyer, conveyance related problems such as their breaking into pieces in transit may occur. That is, almost all tile-shaped raw materials, the water content of which is 6 to 18%, are damaged by a fall of about 0.5 to 1 meter. As a result, as described in Japanese Patent Laid-Open Publication No. Hei. 11-12621, a complicated feeding device was necessary for softly placing these tiles in the furnace, which presented problems typified by an increase in investment cost.

As described above, for reducing a water containing powdery raw material in a rotary hearth, the conventional method entailed a lot of complicated devices for drying or shaping the raw material and thus had a problem of a high construction cost. In other words, the conventional method had economical problems related to both plant investment and operation cost, and a facility which realizes a novel method capable of solving these problems has been demanded.

Furthermore, by providing such a complicated feeding device in the vicinity of a high temperature zone of 1000° C. or higher, the components of the feeding device were distorted by heat or corroded under high temperatures, and there were many maintenance related problems.

In addition, wet raw materials in the form of tiles have a problem with respect to their tendency towards explosive-cracking. Although they are less explosive than pellets, yet those with a high moisture content of 12 to 18% by mass such as described in Japanese Patent Laid-Open Publication No. Hei. 11-12621 tend to explode easily. This is because, if the raw material is in the form of tiles, water vapor does not move in a lateral direction. In other words, if the raw material is in the form of tiles, due to their length being extremely long in a lateral direction spatially, water vapor is discharged only in a vertical direction, causing a rise in passage resistance to facilitate their explosive-cracking.

As described above, a method according to which the reduction is effected through calcination by a rotary hearth without drying a moisture-rich powdery raw material is desirable. However, in the furnace heated to high temperatures, moisture is violently vaporized from moisture-rich shaped articles to cause explosive cracking of the articles. As a result, the shaped articles are powdered, leading to a large increase in the amount of dust exhausted together with exhaust gas and an extreme decrease in agglomerate production yield. That is, a direct calcination-reduction of shaped articles having a relatively high moisture content according to a conventional method was not economical.

As described above, every conventional method described above has economical problems in reducing a water containing powdery raw material by a rotary hearth, and a novel technique for solving such problems has been demanded.

The present invention will be described below with the numbers (1) to (25).

(1) A facility for reducing a metal oxide which is characterized by including: a compression molding machine for shaping the mixture of a water containing powder containing a metal oxide and a powder containing carbon into a cylindrical or granular shaped article; a shaped article transporting conveyer; a shaped article feeding device; and a rotary hearth reducing furnace, wherein the aforementioned devices are placed in this order and connected to each other by transporting means.

(2) A facility for reducing a metal oxide which is characterized by including: a device for mixing a powder containing a metal oxide and a carbon-based powder in a water containing condition; a slurry transporting device; a dehydrator; a compression molding machine for producing a cylindrical or granular shaped article; a shaped article transporting conveyer; a shaped article feeding device; and a rotary hearth reducing furnace, wherein the aforementioned devices are placed in this order and connected to each other by transporting means.

(3) The facility for reducing a metal oxide according to (2) which is characterized by using, as the dehydrator, a dehydrator having a belt-like filter for receiving the mixture of a metal oxide-containing powder and a carbon-based powder in a water containing condition and twin rolls between which the filter is sandwiched and compressed.

(4) The facility for reducing a metal oxide according to (2) which is characterized by using, as the dehydrator, a centrifugal dehydrator having a vertically cylindrical slurry holder a bottom of which is tapered inward and a screw-type powder discharge mechanism provided inside the holder, wherein the difference in rotation rate between the slurry holder and the powder discharge mechanism is 2 to 30 rotations per minute, and the centrifugal force exerted on the slurry holder is 500 G or more.

(5) The facility for reducing a metal oxide according to (2) which is characterized by using, as the dehydrator, a dehydrator having a device for, from both sides, pressing a filter for receiving the mixture of the powder containing the metal oxide and the powder containing carbon in a water containing condition with a force of $10^6$N/m$^2$ or more.

(6) The facility for reducing a metal oxide according to (1) or (2) which is characterized by using, as the molding machine, a compression molding machine of a type which extrudes a wet powder from holes each having a diameter of 30 mm or less.

(7) The facility for reducing a metal oxide according to (1) or (2) which is characterized by using, as the molding machine, a briquette molding machine a maximum thickness of each concavity of which is 30 mm or less.

(8) The facility for reducing a metal oxide according to (1) or (2) which is characterized in that in the course of transportation from a shaped article manufacturing machine to a hearth of a rotary furnace, a total drop distance of the shaped article is 4.1 m or less.

(9) The facility for reducing a metal oxide according to (1) or (2) which is characterized by using, as the shaped article feeding device, a swing-type belt conveyer.

(10) The facility for reducing a metal oxide according to claim 2 which is characterized in that the powder containing the metal oxide and the carbon-based powder are supplied to the device for mixing from a plurality of tanks storing water-containing powders by a grab bucket crane and/or slurry transportation in such a condition as to have a moisture content of 100% or higher relative to the total mass of the powders.

(11) The facility for reducing a metal oxide according to (1) or (2) which is characterized by including a mechanism for controlling an atmospheric temperature of a shaped article supplying zone in the rotary hearth reducing furnace so as to be 1170° C. or lower.

(12) A method of operating a rotary hearth reducing furnace which is characterized by including dehydrating a powdery mixture containing a metal oxide, carbon, and water to a moisture content of 15 to 30% by mass relative to the whole mixture, shaping the mixture into a plurality of cylindrical or granular shaped articles by compression molding, and directly feeding the shaped articles to the reducing furnace for reducing through calcination.

(13) A method of operating a rotary hearth reducing furnace which is characterized by feeding a shaped article having a powder filling rate of 0.43 to 0.58 produced by mixing a powder containing metal oxide and carbon in such a condition as to have a moisture content of 100% or higher relative to the total powder mass, dehydrating it by a dehydrator to a moisture content of 16 to 26% by mass, and shaping it by a compression molding machine to a zone in the furnace an atmospheric temperature at which is 1170° C. or lower, and then reducing the shaped article through calcination at temperatures of 1200° C. or higher.

(14) The method of operating a rotary hearth reducing furnace according to (12) or (13) which is characterized by using, as the dehydrator, a dehydrator having a belt-like filter for receiving a water containing powder and twin rolls between which the filter is sandwiched and compressed in a vertical direction.

(15) The method of operating a rotary hearth reducing furnace according to (12) or (13) which is characterized by using, as the dehydrator, a centrifugal dehydrator having a vertically cylindrical water containing powder holder the bottom of which is tapered inward and a screw-type powder discharge mechanism provided inside the holder in which the difference in rotation rate between the holder and the powder discharge mechanism is 2 to 30 rotations per minute and the centrifugal force exerted on the holder is 500 G or more.

(16) The method of operating a rotary hearth reducing furnace according to (12) or (13) which is characterized by dehydrating with the use of, as the dehydrator, a dehydrator having a device for, from both sides, pressing a filter holding a water containing powder with a force of $10^6$N/m$^2$ or more.

(17) A method of operating a rotary hearth reducing furnace which is characterized by feeding a cylindrical or circular shaped article having a moisture content of 16 to 26% by mass, a thickness or diameter of 30 mm or less, and a powder filling rate of 0.43 to 0.58 and produced by compression-molding the mixture of a metal oxide-containing powder and a carbon-containing powder to a zone in the furnace the atmospheric temperature at which is 1170° C. or lower, and reducing the shaped article through calcination at temperatures of 1200° C. or higher.

(18) The method of operating a rotary hearth reducing furnace according to (12), (13) or (17) which is characterized by using, as the compression molding machine, an extrusion compression molding machine provided with a device for pushing a wet powder and a hole from which the wet powder is extruded.

(19) The method of operating a rotary hearth reducing furnace according to (12), (13), or (17) which is characterized by using, as the compression molding machine, a briquette molding machine in which the wet powder is pressed against concavities provided on surfaces of twin rolls to be shaped.

(20) The method of operating a rotary hearth reducing furnace according to (17) which is characterized by reducing the cylindrical or granular shaped article having the thickness or diameter of 30 mm or less and produced by compression-molding the mixture of the metal oxide-containing powder and the carbon-containing powder.

(21) The method of operating a rotary hearth reducing furnace according to (12), (13), or (17) which is characterized by, when an iron oxide-containing powder is employed as the metal oxide-containing powder, reducing shaped articles the atomic molar weight of fixed carbon of which is 0.5 to 1.5 times the atomic molecular weight of oxygen combined with iron oxide.

(22) The method of operating a rotary hearth reducing furnace according to (12), (13), or (17) which is characterized by feeding the cylindrical or granular shaped article formed by a compression molding machine to an area an atmospheric temperature at which is lower than the other areas inside the furnace for reducing through calcination.

(23) A shaped article of a raw material for use in a reducing furnace which is characterized by being a cylindrical or granular shaped article of 30 mm or less formed by dehydrating a powdery mixture containing a metal oxide, carbon, and water to a moisture content of 15 to 30% by mass relative to the whole mixture and then compression-molding the mixture.

(24) A shaped article of a raw material for use in a reducing furnace which is characterized by being a cylindrical or granular shaped article with a moisture content of 16 to 26% by mass, a thickness or diameter of 30 mm or less, and a powder filling rate of 0.43 to 0.58 obtained by compression-molding a mixture of a metal oxide-containing powder and a carbon-containing powder.

(25) The shaped article of a raw material for use in a reducing furnace according to (23) or (24) which is characterized in that, when an iron oxide-containing powder is employed as the metal oxide-containing powder, the atomic molar amount of fixed carbon is 0.5 to 1.5 times the atomic molar amount of oxygen combined with iron oxide.

The present invention relates to a rotary hearth reducing furnace facility for effecting a reduction reaction with the use of a moisture-rich metal oxide containing powder as a raw material, a method for operating the same, and to a raw material for use in a reducing furnace, and the present invention is carried out in the manner described below. The reduction process of a metal oxide according to the rotary hearth method based on the present invention is illustrated in FIG. 1.

In a mixing vessel 1 as an apparatus for mixing a powdery raw material which is in a moist-rich slurry condition well, the raw material is stirred and mixed by a stirrer 2. The powdery raw material is a mixture of a metal oxide-containing powder and a carbon-containing powder. Examples of the metal oxide-containing powder include pellet feed which is finely divided iron ore, and manganese or chromium ore in a powder form. Besides ores, electric arc furnace dusts, blast furnace gas sludge, basic oxygen furnace dusts, neutral sludge generated upon acid cleaning of iron products, powdery products generated in the refining or processing of metal such as mill scales resulted from the hot-rolling of steel, and others are also available. Moreover, as a reducing agent, a carbon-based powder, such as oil coke, coke breeze, char, powdery coal, or any other fixed carbon-containing powder (hereafter, referred to as carbon powder) is mixed into the powdery raw material.

When transporting the water-containing powdery raw materials from a plurality of tanks storing water-containing powders to the mixing vessel 1, it is desired that the metal oxide-containing powder is conveyed by a grab bucket crane or slurry transportation.

For evenly stirring the powdery raw material in a slurry state within a short period of time, the material needs to contain a large amount of water. A variety of experiments performed by the inventors have revealed that a high moisture content makes the mixing of the powdery raw material smoother. That is, a high water content and its consequent high fluidity make the time taken to mix the raw material homogeneously shorter, resulting in a saving in power required therefore. The inventors have also found that, with moisture content of 100% or more relative to the total mass of the powders, the fluidity of the slurry becomes higher. In short, for making the mixing smoother, it is necessary to stir the mixture of a metal oxide-containing powder and a carbon-containing powder in such a condition as to have a moisture content of 100% or more relative to the total mass of the powders.

For preventing the powders from readily settling, it is preferred that the particle size of each powder is small. By stirring stronger, the use of a powder of relatively large particle size is made possible. However, if the particle size of the metal oxide powder is 100 microns and that of the carbon powder is 180 microns or smaller and thus the mean particle size figured out with their mixing ratio taken into account is 120 microns or less, at a moisture content of 100% by mass, it is made possible to homogeneously mix the slurry at a rate of, usually, about 10 to 30 rotations per minute.

The powdery raw material in a slurry state is sent by a slurry pump 3 to a dehydrator 4. In the dehydrator 4, the raw material is dehydrated to a moisture content of, relative to the mass of the powder, 15 to 30%, preferably 16 to 23%. In the case of a powder of large particle size, it is relatively easy to adjust the water content to 16 to 26% by mass, and an ordinary dehydrator, for example, a vacuum dehydrator, a press filter, a centrifugal decanter, or the like can be employed. However, as described above, in the case of dehydration of a slurry constituted of such desirable powdery raw materials as those with a mean particle size of 120 microns or less, since dehydration to a moisture content of 30% by mass or less, preferably 20% by mass or less by an ordinary dehydrator is difficult, a special dehydrator is employed. Moreover, in some cases, several dehydrators of different types are used in combination.

The facility is composed of a unit for pre-milling a raw material, a unit for mixing a raw material, a granulating unit, a pellet-drying unit, a rotary hearth reducing furnace, an exhaust gas treating unit, and a reduced pellet cooling unit.

What is important in the reduction of metal and that of dusts from steel manufacture is, as in the case of a rotary hearth reducing furnace, an apparatus for pelletizing a raw material and a reducing agent. A unit for pretreating the raw material and a unit for bringing the mixture of a powdery metal oxide raw material and a reducing agent into a condition suitable for granulation are also important, and therefore, the facility incorporated a variety of apparatuses for pre-milling the raw material or a ball mill for kneading.

As the dehydrator for the case of the use of a microfine powder, a dehydrator illustrated in FIG. 3 is suitable, and it includes a filter 23 for receiving a slurry and twin rolls 25 between which the filter is sandwiched. In the dehydrator, a slurry 26 is cast on the filter 23 incorporated therein like an endless belt, and the filter is then sandwiched between the compression twin rolls 26 for dehydration. If the moisture content of the slurry is high, pre-dehydration of the slurry in front of the compression twin rolls 26 by a vacuum suction apparatus 24 provided under the filter will facilitate an efficient dehydration.

Moreover, as a dehydrator for the case of an extraordinarily fine powder, the use of a vertical centrifuge is also effective. This centrifuge is a centrifugal dehydrator including a cylindrical slurry holder the bottom of which is tapered inward and a screw-type powder discharge mechanism inside the holder. The difference in rotation rate between the slurry holder and the powder discharge mechanism is 2 to 30 rotations per minute, and the centrifugal force exerted on the slurry holder is 500 G or more. Although the performance of a single dehydrator itself is not so high, due to the centrifugal force, its separation efficiency is good and this dehydrator is suitable for the dehydration of a moisture-rich fine powder. Particularly, it is effective to adopt this dehydrator for the dehydration of a powder the particle size of which is as small as several microns to 30 microns or several microns to 40 microns.

Furthermore, it is also possible to use, as the dehydrator, a high pressure press dehydrator including a device for pressing the slurry-receiving filter from both sides with a force of $10^6 N/m^2$ or greater. However, as compared with the above-mentioned dehydrator equipped with twin rolls, it is inferior in dehydration performance and therefore it is preferred to be employed for the case of relatively crude powders having a particle size of 100 microns or so.

Thereafter, the wet powder dehydrated to a moisture content of 15 to 30% by mass, preferably 16 to 26% by mass is conveyed to a compression molding machine 6 by a sludge transporting conveyer 5, at which the powder is shaped. Examples of the compression molding machine include, typically, a molding machine of the type shown in FIG. 4 in which a wet powder is pressed into holes (hereafter, referred to as a hole-type pelleter) and a briquette molding machine illustrated in FIG. 5 in which a wet powder is pressed against the concavities provided on the twin rolls.

In the hole-type pelleter, as shown in FIG. 4, the wet material is extruded from the holes in the form of cylinders. The raw material is fed from a raw material feeding port 28 and pressed into a number of holes 34 provided on a bottom plate 33 by a roller 32 driven by a driving device 29, a drive power transmitting mechanism 30, and a driving shaft 31 to be shaped into shaped articles 35. As a pelleter employing a different mechanism, there can be mentioned a pelleter of the type including a screw-type pressing mechanism in its body with which the material is pressed against a plate provided with holes. The briquette molding machine is such an apparatus as is illustrated in FIG. 5, in which a powder is fed from a raw material feeding part 36 and compression-molded by rollers 37 provided with concavities 38.

The reason why these types of molding machines are selected is that they can provide shaped articles satisfying the requirements. Two main characteristics that the shaped articles are required to have are being free from explosive cracking in the furnace and high drop resistance in their wet condition.

The pan pellet production method, which is a conventional molding method, is a method in which shaped articles are grown by rolling a powder on a slope to provide new powder layers thereon. The powder filling rate of the pellets produced according to this method is as high as about 0.65 to 0.75, showing it is the very dense shaped article. The dense shaped articles tend to crack explosively at an area of 900° C. or higher in the raw material feeding part of the rotary hearth. If the diameter of the pellets is about 10 mm and the moisture content is 3% by mass or higher, the pellets explosively crack as soon as they are fed to the furnace. Incidentally, the powder filling rate is the rate of the powder volume contained in the volume of a shaped article.

The inventors have repeatedly made experiments on the conditions under which explosive-cracking of wet shaped articles directly fed to the furnace is caused, and finally have found that, for preventing the explosion-cracking of shaped articles, it is important that the powder filling density of the shaped articles is relatively low. That is, the cause of explosive-cracking in a reducing furnace with a rotary hearth is that the shaped articles are supplied to the furnace heated up to as high as 900° C. or higher and water contained therein quickly evaporates, resulting in a rise in the internal pressure of the shaped articles. The inventors of the present invention performed a variety of experiments and finally have found that the explosive-cracking phenomenon is greatly influenced by both the powder filling density and the moisture content of the shaped articles. Incidentally, the powder filling rate is the percentage of the powder occupying inside of a shaped article.

Moreover, they have found that, even if their moisture content is high, a reduction in powder filling rate makes the shaped articles less explosive. For preventing the internal pressure of the shaped articles from being raised upon quick evaporation of the moisture contained therein, the existence of many gaps between the particles constituting the powder is important. A decrease in powder filling rate led to an increase in explosive-cracking marginal moisture content, and a powder filling rate of 0.58 or less did not cause the explosive-cracking phenomenon even with a moisture content of 16 to 26%. However, if the powder filling rate is too low, the drop resistance is deteriorated, so that it is necessary to ensure a powder filling rate of 0.4 or higher.

Generally, the production of shaped articles according to a compression molding method has the advantage that shaped articles produced thereby have a low powder filling rate being a condition for less-explosiveness. For preventing the internal pressure of the shaped articles from being raised upon quick evaporation of the moisture contained therein, the existence of many gaps between the particles constituting the powder is important.

FIG. 6 shows the influence that the powder filling rate exerts on the explosive-cracking marginal moisture content when shaped articles having a diameter of 20 mm are fed to an atmosphere of 1170° C. If the powder filling rate decreases, the explosive-cracking marginal moisture content increases. When the powder filling rate was 0.58 or less, even with a moisture content of 18% by mass, neither explosive-cracking nor partial powdering occurred. A moisture content of 23 to 26% by mass led to the surface peeling phenomenon, but explosive-cracking did not occur. Moreover, in the case of a powder filling rate of 0.55 or less, even with a moisture content of 23 to 30% by mass or so, the surface peeling phenomenon did not occur. That is, in view of the prevention of explosive-cracking, it is desired that the powder filling rate is 0.58 or less. The explosive-cracking marginal moisture content of shaped articles with a low powder filling rate shows a tendency to keep level at 23 to 26% by mass.

Furthermore, the inventors have found that the conditions under which the explosive-cracking phenomenon occurs are different for different shaped article, depending on the shape thereof. Firstly, even if their powder filling rate was 0.58, tile-shape articles 20 mm in thickness and 150 mm in length and width explosively cracked at a moisture content of 17%. On the other hand, despite their having a powder filling rate of 0.58, cylindrical shaped articles having a diameter of 15 mm and a length of 25 mm produced by a hole-type pelleter did not explode until their moisture content reached 25%. Moreover, 20 mm thick almond shape articles having a powder filing rate of 0.58 and a side of 40 mm and produced by a briquette molding machine were free from explosive-cracking up to a moisture content of 23%. That is, in contrast to plate shape articles that easily explode, cylindrical or granular shaped articles are less susceptible to explosive-cracking. Thus, in the present invention, the shape of the shaped articles is specified as cylindrical or granular.

The reason why shaped articles produced by a hole-type pelleter or briquette molding machine are less explosive was also made clear. The surface of a cylindrical shaped article formed by a hole-type pelleter is smooth, but its cross section is rough. As a result, even with a high moisture content, since the passing resistance of water vapor is low, explosive-cracking is inhibited from occurring. Under certain conditions, even with a moisture content of 26% by mass, shaped articles produced by a hole-type pelleter did not explode in a furnace of 1170° C., proving them to be most excellent in explosion resistance. Even if shaped by a briquette molding machine, since the thickness of the raw material is compressed, the density of sides of the briquette shaped article does not rise, consequently allowing water vapor to be readily discharged therefrom. Moreover, the inventors have found that the explosiveness of shaped articles is influenced by their sizes. Even in the case of cylindrical or granular shaped articles, under certain conditions, if the size is 30 mm or more, they explosively crack in the furnace of 1170° C. in spite of their moisture content of 26% by mass. Therefore, it is desired that the thickness or diameter of the shaped articles is 30 mm or less.

In a reducing furnace of the rotary hearth-type, a center-lacking-disk-shape hearth rotates. The hearth passes through a calcination/reducing zone and, in the zone at which shaped articles are discharged, reduced shaped articles are discharged. Thereafter, the hearth arrives to a shaped article supplying part. From the fact that the temperature of the hearth at this point of time is 1150 to 1300° C., it can be seen that, in a normal operation, the temperature of the shaped article supplying part is 1000 to 1250° C. That is, under certain operation conditions, the temperature of the shaped article supplying part can be 1170° C. or higher. In this case, it is preferred that the temperature is adjusted to 1170° C. or lower by cooling the shaped article supplying part. For cooling the shaped article supplying part, it is recommended to provide a water cooling wall as the ceiling surrounding the shaped article supplying part or design the shaped article supplying part so as to be protected from a high temperature combustion gas flowing into it.

Secondly, the important characteristic the shaped articles are required to have is a high drop resistance. In the course of conveyance from the molding machine to the hearth, when passed from one conveyer to another conveyer and fed to the hearth, the shaped articles are dropped several times by a distance of about 0.5 to 2 m. Therefore, they are required to be high in drop resistance (expressed by the total drop distance taken to spoil the shape of the shaped articles). In the case of a rotary hearth reducing furnace, a value of about 4 to 5 meters or more is required. That the drop resistance of shaped articles having a low powder filling rate is generally low is incompatible with the above described conditions under which explosive-cracking is inhibited from occurring. The inventors made studies to improve the drop resistance of shaped articles with a low powder filling rate and have found that, if their moisture content is of a certain value or higher, even if dropped and impacted, the shaped articles are not broken and are only distorted.

The studies on the influence of the moisture content on the drop resistance the inventors made have revealed that, with a moisture content of 16% by mass or more, the drop resistance of shaped articles having a powder filling rate of not less than 0.43 will be 4.2 meters or more. However, when the powder filling rate was 0.43 or less, regardless of its moisture content, the drop resistance was as low as 2 to 4 meters or so. Thus, for assuring a suitable drop resistance, it is desired that the moisture content is 16% by mass or more and the powder filling rate is 0.43 or more.

Moreover, even with the same moisture content or powder filling density as that mentioned above, the above described shaped articles in the form of tiles were broken by just a single fall from the height of 0.5 m. That is, it can be seen that, due to their shape, the drop resistance of tile-shape articles produced according to the method recited in Japanese Patent Laid-Open Publication No. Hei. 11-12624 is too low to allow the shaped articles to be fed to the furnace as they are if handled in a normal manner. In contrast to these shaped articles, those produced in accordance with the present invention were, even if handled in a normal manner, susceptible of being fed to the furnace as they were.

Based on the results of the experiments described above, the inventors have found that, as the requirements of the shaped articles, it is desired that the moisture content falls within the range of 15 to 30% by mass, preferably 16 to 26% by mass and the powder filling rate is in the range of 0.43 to 0.58, and that the above mentioned hole-type pelleter and the briquette molding machine are the most effective apparatuses. Although it is possible to produce shaped articles that meet the object of the present invention by other devices, the hole-type pelleter and briquette molding machine produce shaped articles of high performance at low cost and therefore are the most effective apparatuses.

The shaped articles formed according to the method described above are, in their as-wet condition, supplied to a rotary hearth reducing furnace 9 by a swing conveyer 8 via a shaped article transporting conveyer 7, the swing conveyer 8 being a shaped article supplying device. The temperature of the shaped article supplying part of the rotary hearth reducing agent 9 is 1170° C. or lower.

In the rotary hearth-type reducing furnace 9, the wet shaped articles are fed to a zone the atmospheric temperature at which is 1170° C. or lower. If the atmospheric temperature is 1170° C., even those produced under such conditions as are specified in the present invention may explode, for the pace of increase in the internal temperature of the shaped articles is so high that the water vapor pressure gets high. Therefore, the temperature of this zone needs to be 1170° C. or lower.

In the rotary hearth reducing furnace 9, the shaped articles are calcined at about 1100 to 1350° C., and the metal oxide is reduced by carbon contained in the shaped articles. Since the raw material is stirred and mixed in a moisture-rich condition and therefore the metal oxide and carbon contained in the shaped articles formed therefrom are homogeneously mixed, the raw material mixing method of the present invention has the effect of helping the reaction to be carried out efficiently.

Furthermore, the inventors have found the importance of controlling the ratio of carbon in the reduction of iron oxide. When reducing iron oxide, if the amount of carbon is insufficient, in some cases, the reduction is not effected completely, resulting in a decrease in the degree of metallization. Moreover, if the amount of carbon is excessive, excess carbon reacts with iron to form cementite ($Fe_3C$) and, at 1200° C. or so, the reduced shaped articles start melting in the furnace. Since the hearth or discharging device of an ordinary rotary hearth reducing furnace is not designed for molten iron, if iron melts, there arises the problem that the hearth is damaged.

If the amount of fixed carbon contained in the shaped articles is 1.5 times or less the molar number of fixed carbon figured out on the assumption that it reacts with oxygen combined with iron oxide to produce carbon monoxide (hereafter, referred to as calculated molar amount of carbon), the above mentioned problems of incomplete reduction and molten iron do not occur. Moreover, the inventors have found that in the reaction among the reaction to produce carbon monoxide and the reaction to produce carbon dioxide, 10 to 70% of the carbon atoms reactive with iron oxide are reacted to produce carbon dioxide though it changes for different conditions. As a result, if the amount of fixed carbon is half the calculated carbon molar amount or more, there can be obtained reduction products the degree of metallization of which is 70% or higher.

When the amount of fixed carbon is half the calculated carbon amount, the degree of metallization of iron is about 80% and therefore the resulting product is somehow susceptible of direct use as reduced iron. On the other hand, in the case where the amount of fixed carbon is 1.5 times the calculated carbon amount, the degree of metalization is as high as 97%. The amount of residual carbon was about 2.5% relative to the amount of reduced iron at this time. Accordingly, even if the whole residual carbon has been carburized with iron, the melting point of the resulting product is kept at 1300° C. or higher. Therefore, in the rotary hearth reducing furnace the internal temperature of which is, at the highest, about 1300° C., the problem that the reduced product melts does not occur.

The reduced shaped articles are discharged from the rotary hearth reducing furnace 9 and cooled to normal temperature in a product cooling device 13. However, in the case of use in an electric arc furnace or the like, the shaped articles the temperature of which is as high as 900° C. may be subjected to a melting step as they are. Via a gas cooling device 10 and a dust collector 11, exhaust gas generated upon combustion in the rotary hearth reducing furnace 9 is exhausted to atmosphere through a chimney 12.

Incidentally, the shaped articles of raw materials for use in a rotary hearth reducing furnace need only be cylindrical or granular ones that are produced by compression-molding the mixture of a metal oxide-containing powder and a carbon-containing powder and have a water content of 15 to 30% by mass, preferably 16 to 26% by mass, a powder filling rate of 0.43 to 0.58, and a thickness or diameter of 30 mm or less, and they are not necessarily required to be produced in accordance with the process described above. Even with those produced by a different technique, if they satisfy the requirements, the reduction can be effected in such a manner as to meet the object of the present invention.

Application of the present invention to the treatment of sludge or dusts generated in the refining or processing of metal is particularly effective. For example, the gas ash from the blast furnace of a steel plant is collected by a wet-type venturi scrubber and made into a slurry by a thickener. Moreover, there are neutralized sludge of corrected waste acid generated in the acid cleaning. Such dusts or sludge are processed by a dehydrator. However, in addition to the fact that it is difficult to recycle them, their recycle is costly. For example, by directly sending these dusts or sludge from the thickener to the mixing vessel 1, it is made possible to produce, without an intermediate treatment, shaped articles of raw materials for reduction with ease. Accordingly, the use of dusts or sludge generated in the course of metal refining or processing is one of the most desirable methods in the present invention.

For comparison of the operation methods, a facility employed in a conventional method is shown in FIG. 2. In the conventional facility, after the dehydration step in the case of operation by the facility of the present invention, the raw material is conveyed by a sludgy powder transporting conveyer 15 to a powder dryer 16, at which the raw material is dried to a moisture content of 5 to 10% by mass. Then, while adding water to the powder by a water sprinkler 18, the raw material is pelletized by a granulator 17. The resulting pellets are sent to a pellet dryer 20 by a pellet transporting conveyer 19, at which they are dried to a moisture content of about 2% by mass. Thereafter, the pellets are reduced through calcination by a rotary hearth reducing furnace. As can be understood from the above, the operation by a conventional method includes many steps and its process is complicated as compared with that of the present invention. In addition, a large amount of energy is consumed in a series of moisture controlling steps of dehydration, drying, hydration, and dehydration, proving the facility according to the present invention to be effective in comparison with the operation by a conventional method. From the view point of the raw material to be used in the rotary hearth reducing furnace, the present invention provides a technique for producing reduction-use shaped articles from a wet raw material in the easiest manner. As for the requirements, it is preferred that the shaped articles which are produced by a compression molding machine are cylindrical or granular and have a thickness or diameter of 30 mm or less, a moisture content of 15 to 30% by mass, preferably 16 to 26% by mass, and a powder filling rate of 0.43 to 0.58. By reducing the shaped articles formed according to the process described above, there are obtained shaped articles of raw materials which are, due to their high drop resistance and non-explosiveness, economically reducible by a rotary hearth reducing furnace.

BEST MODE FOR CARRYING OUT THE INVENTION

Figure 1:
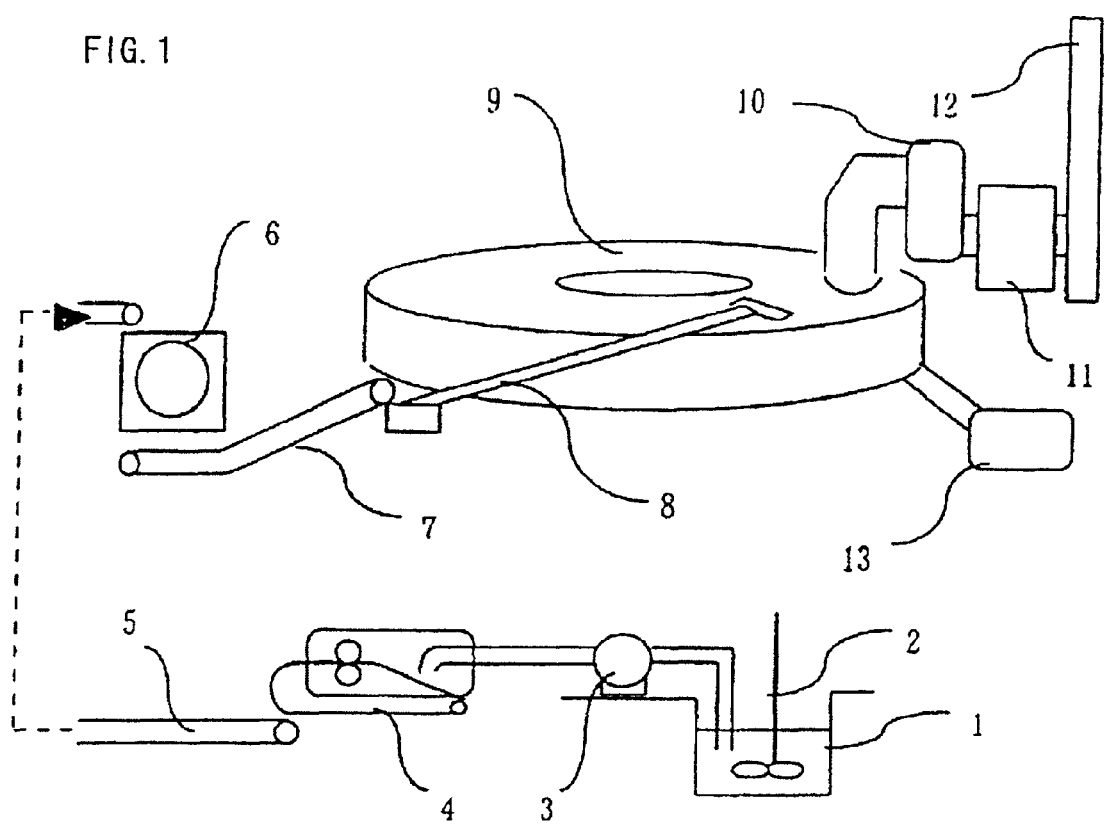
FIG. 1 shows one embodiment of the structure of a rotary hearth reducing furnace for reducing a water containing powdery raw material based on the present invention.

Examples in which operations were carried out in accordance with the present invention are shown in Table 1. The facility employed is one that is illustrated in FIG. 1, the reduction performance of which is, in terms of the amount of wet shaped articles, 10 tons per hour. As the dehydrator, a dehydrator of the twin roll-type was employed, and a hole-type pelleter was used as the molding machine.

The numbers in the drawings are defined as 1: mixing vessel 2: stirrer 3: slurry pump 4: dehydrator 5: sludge transporting conveyer 6: compression molding machine 7: shaped article transporting conveyer 8: swing conveyer 9: rotary hearth reducing furnace 10: gas cooling device 11: dust collector 12: chimney 13: product cooling device 14: dehydrator 15: sludgy powder transporting conveyer 16: powder dryer 17: granulator 18: water sprinkler 19: pellet transporting conveyer 20: pellet dryer 21: dry pellet conveyer 22: slurry port 23: filter 24: vacuum suction apparatus 25: compression twin rolls 26: slurry 27: dehydrated product 28: raw material supplying port 29: driving device 30: driving force transmitting mechanism 31: driving shaft 32: roller 33: bottom plate 34: holes 35: shaped article 36: raw material supplying part 37: compression rollers 38: concavities 39: briquettes.

EXAMPLES 1 AND 2

As shown in Table 1, two types of raw materials: the mixture of pellet feed being microfine powdery ore and coke breeze of 1 mm or less; and the mixture of blast furnace gas sludge from a plant of through-steel manufacture, sedimentary sludge of scale pit generated by the hot rolling, and coke breeze of 1 mm or less were employed.

TABLE 1

| Raw material (iron source) | Unit | Example 1 Pellet feed | Example 2 Blast furnace gas sludge Scale pit sedimentary sludge |
|---|---|---|---|
| FeO | % | 1.2 | 10.5 |
| Fe$_2$O$_3$ | % | 80.3 | 58.3 |
| C | % | 12.5 | 10.2 |

TABLE 1-continued

| Raw material (iron source) | Unit | Example 1 Pellet feed | Example 2 Blast furnace gas sludge Scale pit sedimentary sludge |
|---|---|---|---|
| ZnO | % | 0.01 | 0.95 |
| Na | % | 0.12 | 0.25 |
| K | % | 0.03 | 0.33 |
| Raw material shaped article | | | |
| Moisture content of slurry | % | 130 | 185 |
| Moisture content of shaped article | % | 17.1 | 19.8 |
| Powder filling rate | | 0.57 | 0.55 |
| Drop resistance of shaped article | m | 4.7 | 6.9 |
| Conditions of reducing furnace | | | |
| Temperature of raw material supplying part | °C. | 981 | 983 |
| Reducing temperature | °C. | 1210 | 1210 |
| Reducing time | min | 15 | 15 |
| Product | | | |
| Degree of metallization | % | 95.2 | 92.8 |
| Degree of dezincing | % | 89.2 | 97.3 |
| Degree of dealkalization | % | 97.8 | 99.1 |
| Agglomerate production yield | % | 93.8 | 95.4 |

The operation conditions are as shown in Table 1. The moisture content of the raw material in the mixing vessel 1 is 130 to 185% relative to the mass of the powder, and that of the raw material before molding is 17 to 20% relative to the mass of the powder. The powder filling rate is within the range specified in the present invention. The diameter and length of each shaped article are 15 mm and 25 mm, respectively. The furnace temperature of the shaped article supplying part is about 980° C. The furnace temperature of the reduction zone is 1210° C. Moreover, the reduction time is 15 minutes.

Example 1 is the case of an operation which used pellet feed. Since the carbon mixing ratio was appropriate, its productivity was high. The operation was performed at a degree of metallization of as high as 97% and was substantially free from powdering due to a fall and explosive-cracking, so that its agglomerate production yield was as high as 94%. Example 2 is the case of operation with the use of blast furnace gas sludge and sedimentary sludge of scale pit generated by the hot rolling, aiming at not only reduction but also dezincification and dealkalization. In this operation, the degree of metallization was 91%, the degree of dezincification was 97.5%, and the degree of dealkalization was 99%. As can be seen from these figures, impurities were effectively eliminated. This case was also substantially free from powdering due to a fall and explosive-cracking, so that its agglomerate production yield was as high as 95%.

Figure 2:
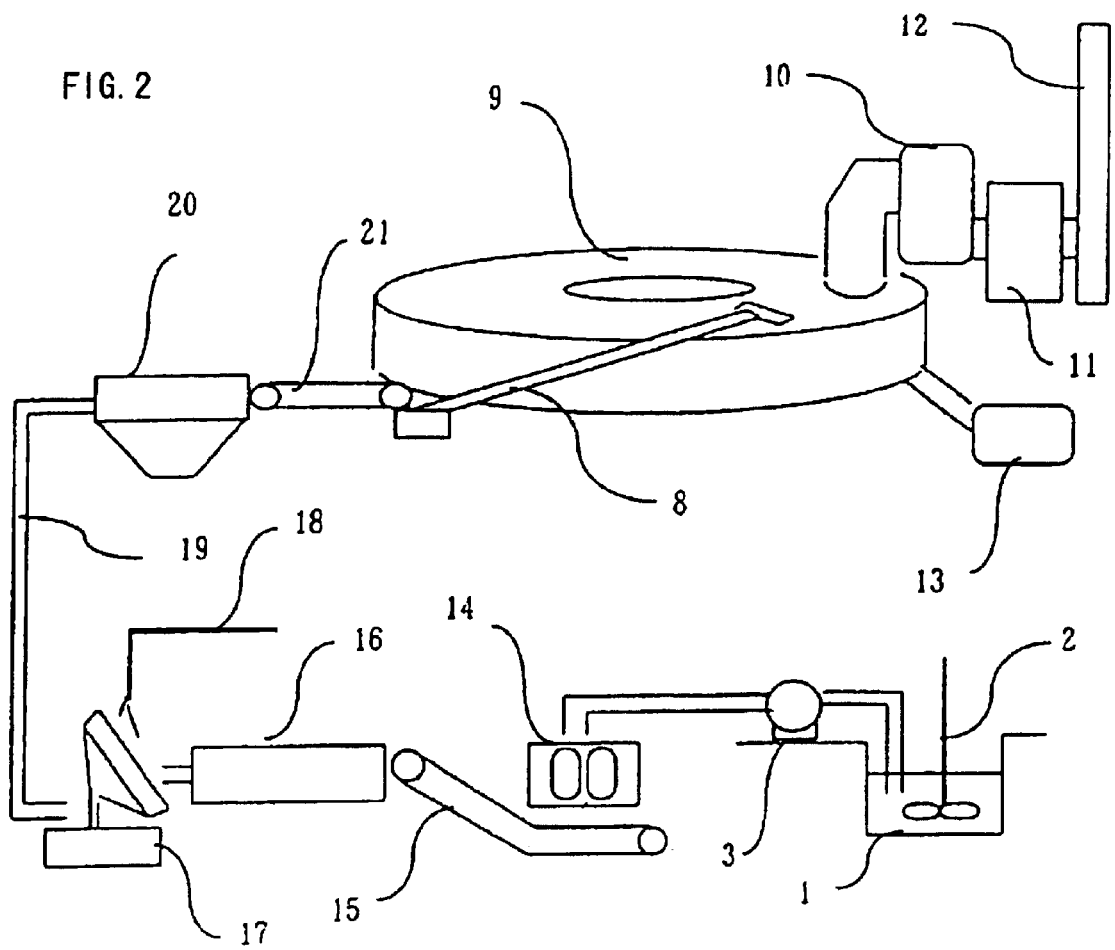
FIG. 2 shows one embodiment of the structure of a rotary hearth reducing furnace based on a conventional method.
Figure 3:
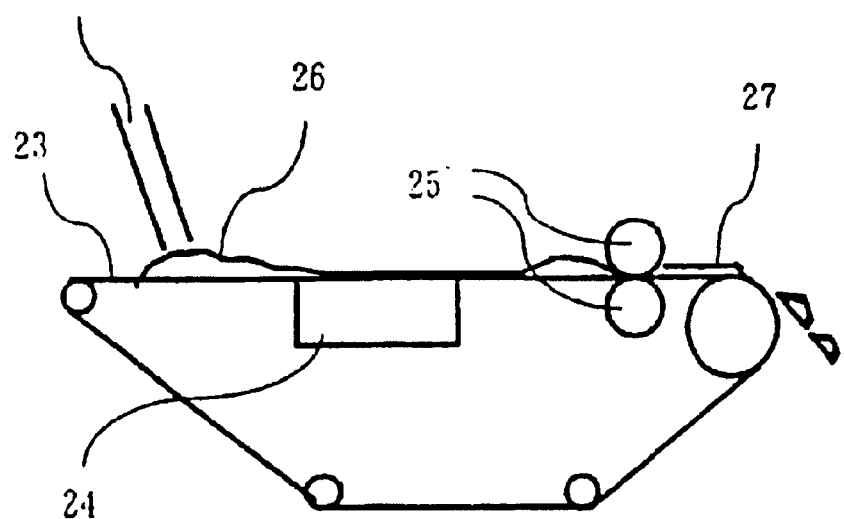
FIG. 3 shows a dehydrator of the type in which a slurry is cast on an endless belt filter and compressed by compression twin rolls.
Figure 4:
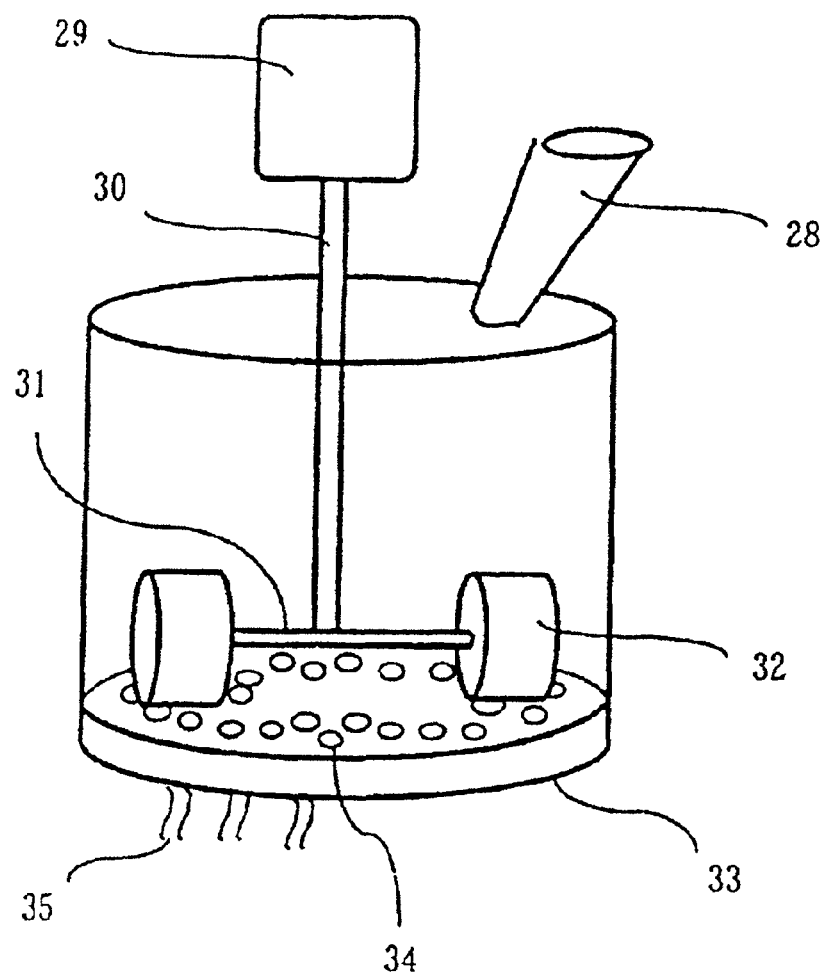
FIG. 4 shows a compression molding machine of the type in which a powder is extruded from its holes.
Figure 5:
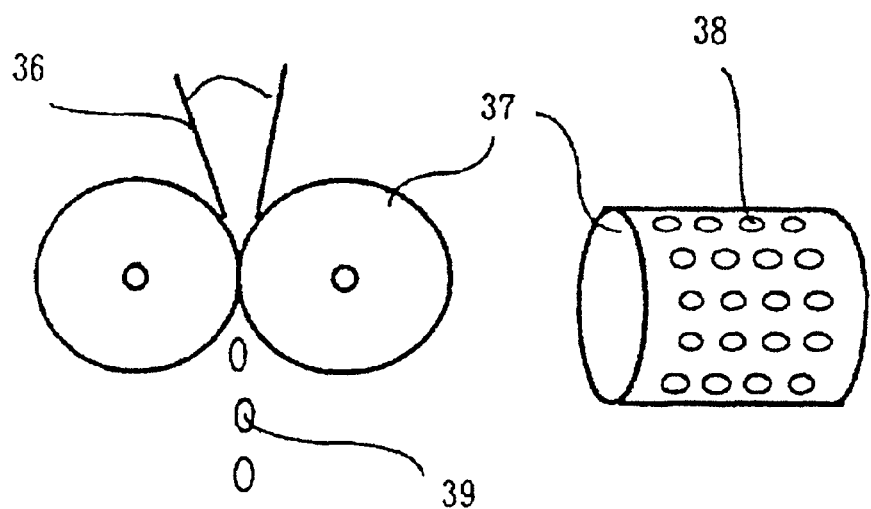
FIG. 5 shows a briquette compression molding machine of the type in which a powder is compression-molded in its concavities. The left is a schematic view and the right illustrates compression rolls.
Figure 6:
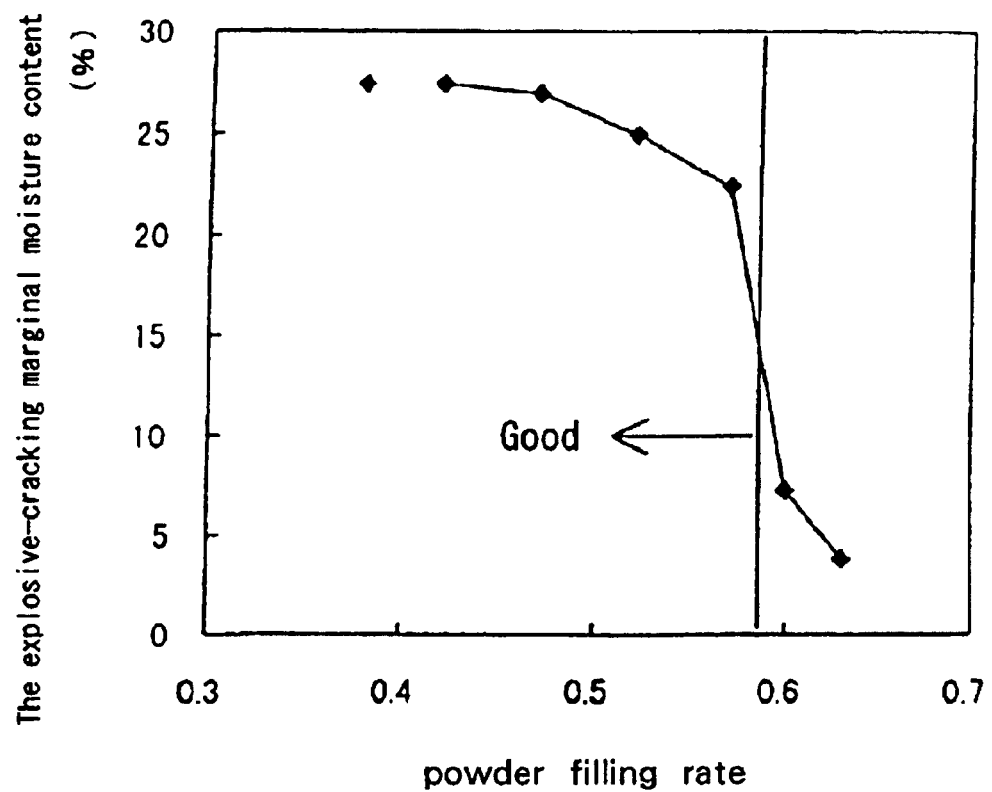
FIG. 6 is a graph showing the influence the powder filling rate of the shaped article exerts on the explosive-cracking marginal moisture content at 1170° C.

The reduction according to the present invention and that according to a conventional method employing the facility as illustrated in FIG. 2 were compared from an economical viewpoint. In the operation of the present invention, since the pretreatment of the raw material is composed only of a mixing step, a dehydration step, and a molding step, the cost of pretreatment of the raw material does not exceed approximately 30% of that in the comparative example. Moreover, the present invention provides a saving of about 15% in the amount of money cost throughout the process. Furthermore, in Examples, as compared with the comparative example, the construction cost was reduced by about 10%, because the pretreatment in the present invention is simpler than that in the comparative example.

As described above, the rotary hearth reducing furnace facility employing a wet powder according to the present invention is free from such operation related problems as explosive-cracking of shaped articles of raw materials. The construction cost of this facility is low, and it is possible to operate the facility at low cost, including savings in energy consumption and other operation related costs. Moreover, the cost of maintenance of the facility according to the present invention is low and the facility enables a metal oxide to be reduced economically. Particularly, since it is possible to omit a powder drying step and a device used therein, its effect of reducing the equipment cost is great.

EXAMPLES 3, 4

As the raw materials, as shown in Table 2, two types of mixtures were employed, one of which is the mixture of pellet feed being a microfine powdery ore and coke breeze of 1 mm or less and the other is the mixture of blast furnace gas sludge from a through-steel manufacturing plant, sedimentary sludge of scale pit generated by the hot rolling, and coke breeze of 1 mm or less.

TABLE 2

| Raw material (iron source) | Unit | Example 3 Pellet feed | Example 4 Blast furnace gas sludge Scale pit sedimentary sludge |
|---|---|---|---|
| FeO | % | 1.2 | 10.5 |
| Fe$_2$O$_3$ | % | 80.3 | 58.3 |
| C | % | 12.5 | 10.2 |
| ZnO | % | 0.01 | 0.95 |
| Na | % | 0.12 | 0.25 |
| K | % | 0.03 | 0.33 |
| Raw material shaped article | | | |
| Moisture content of slurry | % | 130 | 185 |
| Moisture content of shaped article | % | 17.1 | 19.8 |
| Powder filling rate | | 0.57 | 0.55 |
| Drop resistance of shaped article | m | 4.7 | 6.9 |
| Conditions of reducing furnace | | | |
| Temperature of raw material supplying part | °C. | 981 | 983 |
| Reducing temperature | °C. | 1210 | 1210 |
| Reducing time | min | 15 | 15 |
| Product | | | |
| Degree of metallization | % | 95.2 | 92.8 |
| Degree of dezincing | % | 89.2 | 97.3 |
| Degree of dealkalization | % | 97.8 | 99.1 |
| Agglomerate production yield | % | 93.8 | 95.4 |

The operation conditions are as shown in Table 2. The moisture content of the raw material in the mixing vessel 1 is 120 to 200% of the mass of the powder, and that of the raw material before molding is 17 to 20% of the mass of the powder. The powder filling rate is within the range specified in the present invention. The diameter and length of each shaped article are 15 mm and 25 mm, respectively. The furnace temperature of the shaped article supplying part is about 980° C. The furnace temperature of the reduction zone is 1210° C. Moreover, the reduction time is 15 minutes.

Example 3 is the case of an operation which used pellet feed. Since the carbon mixing ratio was appropriate, its productivity was high. The operation was performed at a degree of metallization of as high as 97% and was substantially free from powdering due to a fall and explosive-cracking, so that its agglomerate production yield was as high as 94%. Example 4 is the case of operation with the use of blast furnace gas sludge and sedimentary sludge of scale pit generated by the hot rolling, aiming at not only reduction but also dezincification and dealkalization. In this operation, the degree of metallization was 91%, the degree of dezincification was 97.5%, and the degree of dealkalization was 99%. As can be seen from these figures, impurities were effectively eliminated. This case was also substantially free from powdering due to a fall and explosive-cracking, so that its agglomerate production yield was as high as 95%.

The reduction according to the present invention and that according to a conventional method employing the facility as illustrated in FIG. 2 were compared from an economical viewpoint. In the operation of the present invention, since the pretreatment of the raw material is composed only of a mixing step, a dehydration step, and a molding step, the cost of pretreatment of the raw material does not exceed approximately 30% of that in the comparative example. Moreover, the present invention provides a saving of 15% in the amount of money cost throughout the process.

As described above, the operation with the use of a wet powder according to the present invention is free from such operation related problems such as explosive-cracking of shaped articles of raw materials. The construction cost of this facility is low, and it is possible to operate at low cost, including savings in energy consumption and other operation related costs. As a result, reduction of ores and powders such as metal oxide-containing dusts or sludge by a rotary hearth reducing furnace was economically carried out.

INDUSTRIAL APPLICABILITY

According to the present invention, in a rotary reducing furnace method, with the use of a wet powdery raw material, it is possible to effect the reduction of a metal oxide thereby to produce a metal. Moreover, the present invention is effective in economically treating metal oxide-containing dusts or sludge generated by the metal manufacturing industry, and reduction of a moisture-rich metal oxide containing powder or treatment of metal oxide-containing dusts or sludge generated in the process of metal refining or processing are economically effected through a small number of steps by a facility for reducing a metal oxide, incorporating a rotary hearth reducing furnace. The operation by the present invention is particularly effective in treating dusts or sludge containing a large amount of moisture.

What is claimed is:

1. A method of operating a rotary hearth reducing furnace, which comprises dehydrating a powdery mixture containing a metal oxide, carbon, and water to a moisture content of 15 to 30% by mass relative to the whole mixture; shaping said mixture into a plurality of cylindrical or granular shaped articles by compression molding; and directly feeding the resulting shaped articles in their as-wet condition to the reducing furnace for reducing through calcination.

2. A method of operating a rotary hearth reducing furnace, which comprises feeding a shaped article having a powder filling rate of 0.43 to 0.58 produced by mixing a powder containing metal oxide and carbon in such a condition as to have a moisture content of 100% or higher relative to the total powder mass, dehydrating the mixture by a dehydrator to a moisture content of 16 to 26% by mass, and shaping the mixture by a compression molding machine to a zone in the furnace the atmospheric temperature at which is 1170° C. or lower, and then reducing the shaped article through calcination at temperatures of 1200° C. or higher.

3. The method of operating a rotary hearth reducing furnace according to claim 1 or 2, wherein dehydrating is conducted by a dehydrator having a belt-like filter for receiving a water containing powder and twin rolls between which said filter is compressed in a vertical direction.

4. The method of operating a rotary hearth reducing furnace according to claim 1 or 2, wherein dehydrating is conducted by a centrifugal dehydrator having a vertically cylindrical water containing powder holder a bottom of which is tapered inward and a screw powder discharge mechanism provided inside the holder in which a difference in rotation rate between said holder and said powder discharge mechanism is 2 to 30 rotations per minute and a centrifugal force exerted on the holder is 500 G or more.

5. The method of operating a rotary hearth reducing furnace according to claim 1 or 2, wherein dehydrating is conducted by a dehydrator having a device for, from both sides, pressing a filter holding a water containing powder with a force of $10^6 N/m^2$ or more.

6. A method of operating a rotary hearth reducing furnace, which comprises feeding a cylindrical or circular shaped article having a moisture content of 16 to 26% by mass, a thickness or diameter of 30 mm or less, and a powder filling rate of 0.43 to 0.58 and produced by compression-molding a mixture of a metal oxide-containing powder and a carbon-containing powder to a zone in the furnace the atmospheric temperature at which is 1170° C. or lower, and reducing the shaped article through calcination at temperatures of 1200° C. or higher.

7. The method of operating a rotary hearth reducing furnace according to claim 1 or 6, wherein compression molding is conducted by an extrusion compression molding machine provided with a device for pushing a wet powder and a hole from which the wet powder is extruded.

8. The method of operating a rotary hearth reducing furnace according to claim 1, 2, or 6, wherein compression molding is conducted by a briquette molding machine in which the wet powder is pressed against concavities provided on surfaces of twin rolls to be shaped.

9. The method of operating a rotary hearth reducing furnace according to claim 1 or 2, wherein the shaped article to be reduced has a thickness or diameter of 30 mm or less.

10. The method of operating a rotary hearth reducing furnace according to claim 1, 2, or 6, wherein the shaped article is reduced with an atomic molar amount of fixed carbon which is 0.5 to 1.5 times an atomic molar amount of oxygen combined in iron oxide when an iron oxide-containing powder is employed as the metal oxide-containing powder.

11. The method of operating a rotary hearth reducing furnace according to claim 1, 2, or 6, wherein the shaped article formed by a compression molding machine is fed to a zone having an atmospheric temperature which is lower than the other areas inside the furnace, and reduced through calcination.

* * * * *